United States Patent [19]

Areaux et al.

[11] 4,377,259
[45] Mar. 22, 1983

[54] CHIP AND TURNINGS SEPARATOR AND CRUSHER

[75] Inventors: Larry D. Areaux, Kalamazoo; Russell D. Dudley, Vicksburg, both of Mich.

[73] Assignee: Reclamet, Inc., Kalamazoo, Mich.

[21] Appl. No.: 132,519

[22] Filed: Mar. 21, 1980

[51] Int. Cl.³ .............................................. B02C 4/08
[52] U.S. Cl. ...................................... 241/73; 241/81; 241/236
[58] Field of Search ...................... 241/24, 32, 33, 37, 241/81, 97, 235, 236, 69, 73, 166, 193

[56] References Cited

U.S. PATENT DOCUMENTS

| | | | |
|---|---|---|---|
| 2,036,207 | 4/1936 | Feddern et al. | 241/236 |
| 2,148,022 | 2/1939 | Haaland | 241/81 X |
| 2,894,697 | 7/1959 | Panning et al. | 241/236 X |
| 3,396,914 | 8/1968 | Liebman | 241/236 X |
| 3,462,088 | 8/1969 | Ionescu | 241/193 |
| 3,934,826 | 1/1976 | Graveman | 241/81 |
| 3,998,396 | 12/1976 | Umphrey et al. | 241/81 |
| 4,015,780 | 4/1977 | Hall | 241/241 X |
| 4,030,865 | 6/1977 | Kobayashi | 241/73 X |
| 4,034,918 | 7/1977 | Culbertson et al. | 241/236 X |
| 4,168,035 | 9/1979 | Palm et al. | 241/81 |

Primary Examiner—Mark Rosenbaum
Attorney, Agent, or Firm—Price, Heneveld, Huizenga & Cooper

[57] ABSTRACT

A device is disclosed to facilitate the crushing of the metal scrap received from a machine shop as part of a metal and cutting oil recovery system. The device involves the use of a grate ahead of the crusher to separate chunky metal parts or heavies and fines from the enmeshed coils and snarled turnings resulting from machining. The coils and turnings free of the chunk materials are forcibly fed into a crusher designed to automatically eject any chunky material which escapes the separation process.

2 Claims, 7 Drawing Figures

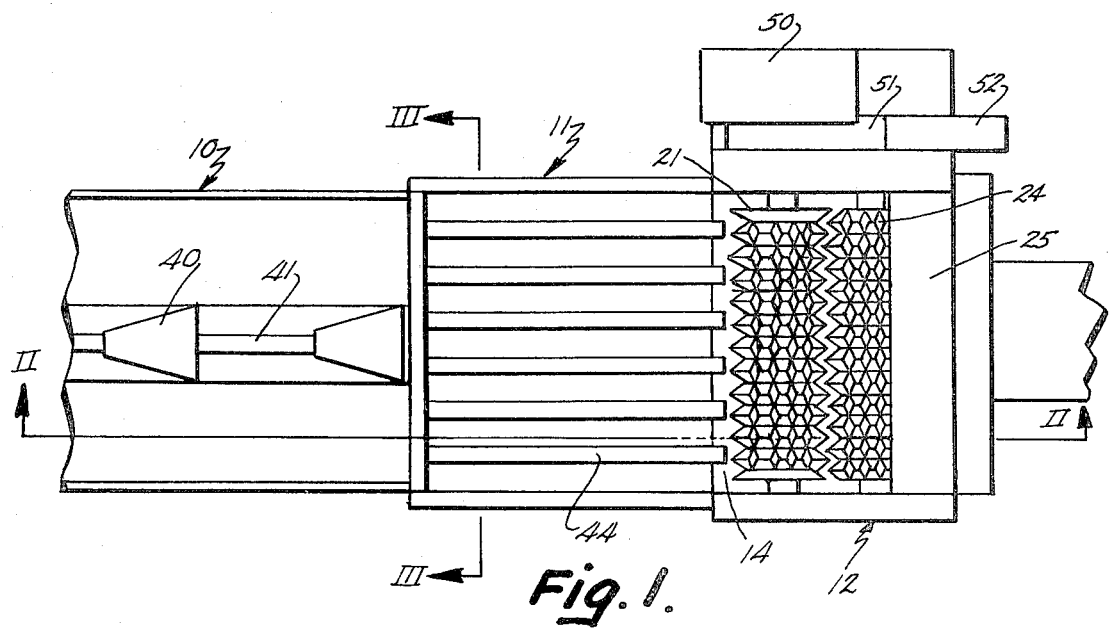
Fig. 1.
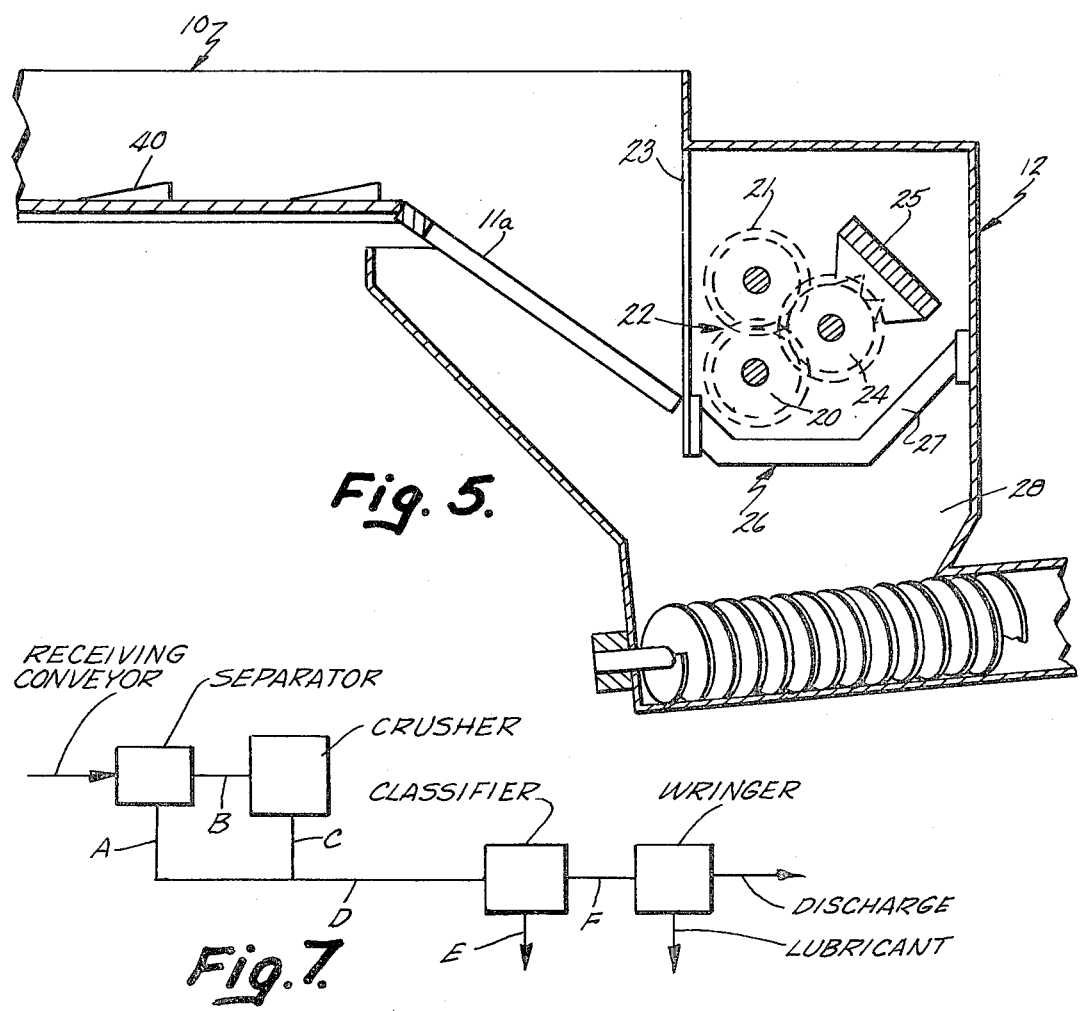
Fig. 5.
Fig. 7.

CHIP AND TURNINGS SEPARATOR AND CRUSHER

BACKGROUND OF THE INVENTION

The invention relates to equipment for recovering and preparing for reuse the scrap metal produced in machining operations. Basically this material consists of chips and borings and shavings produced by such machines as planers, automatic screw machines, boring machines, lathes, milling machines and saws. This material is normally coated with the lubricant used in the machining process. The material frequently has a wide range of sizes and shapes. Some of the material is in the form of chips and small pieces requiring no size reduction. Significant quantities of the material consist of elongated spirals frequently simulating coiled springs. These latter machine turnings tend to become intermeshed producing a bulky, springy, snarled and entangling matrix which must be reduced to small chips to permit efficient extraction of the oil and also to reduce the bulk.

The common method of reducing this type of material to small chips or pieces is to pass it through a hammermill or a crusher which reduces these materials to a reasonably uniform small chip or short length. A number of crushers are available, employing a variety of reduction means. So far as is known, all of this equipment is designed for vertical feed, that is, the material to be crushed is fed from the top, passes down through the crusher and the processed material is discharged at the bottom.

If the material, as received at the crusher, consisted entirely of chips, machine turnings, boring and the like, the problem of effectively crushing and reducing the metallic materials to a reasonably uniform, small size would be relatively simple. However, normally these materials, as received at the crusher, contain a substantial quantity of large pieces or chunks which are not the product of machining of various metal parts. It is these components of the material which causes substantial difficulty. These include such items as ends of bar stock, bolts and steel parts from the machines on which the materials have been machined, broken and scrap parts. These materials are not suitable for processing in the crushers. When such materials enter the crusher, they become jammed in the teeth or between the rolls of the crusher, causing damage and, in some cases, stalling the crusher. When this happens, even if the crusher is not damaged, it is necessary to stop the equipment and clean out the crusher to free it for further operation. This is an expensive and time consuming procedure and materially reduces the economic efficiency of reclaiming the scrap from machining operations. Heretofore, there has been no successful means by which this problem could be eliminated despite the fact that it has plagued the machine turnings recovery field for a number of years.

BRIEF DESCRIPTION OF THE INVENTION

The invention provides a crusher so designed that the material being fed to the crusher enters from the side rather than from the top. The invention includes means to positively bias the material to enter the crusher. In combination with this, the invention provides a separating grate or grizzly between the end of the conveyor bringing the metal turnings to the crusher and the entry port where these materials enter the crushing rolls. The grizzly provides a separation area across which the entangled turnings are moved. Because they are so intermeshed, they cannot pass through the grizzly whereas the larger, heavier metallic chunks and fines are dropped out of the tangled mass through the grizzly before they can enter the crusher. The invention contemplates the use of an automatic, reversing mechanism for the crushing rollers which will eject a larger piece of chunk material before it results in damage to the crushing rolls. The grizzly will permit the chunk to drop out, eliminating the problem.

BRIEF DESCRIPTION OF THE DRAWINGS

FIG. 1 is a plan view of the crusher of this invention together with a chunk removing grizzly or grate ahead of it; FIG. 5 is a sectional, elevational view similar to FIG. 2 showing a modified construction for the invention; FIG. 7 is a flow diagram of a process utilizing this invention.

DESCRIPTION OF THE INVENTION

Figure 2:
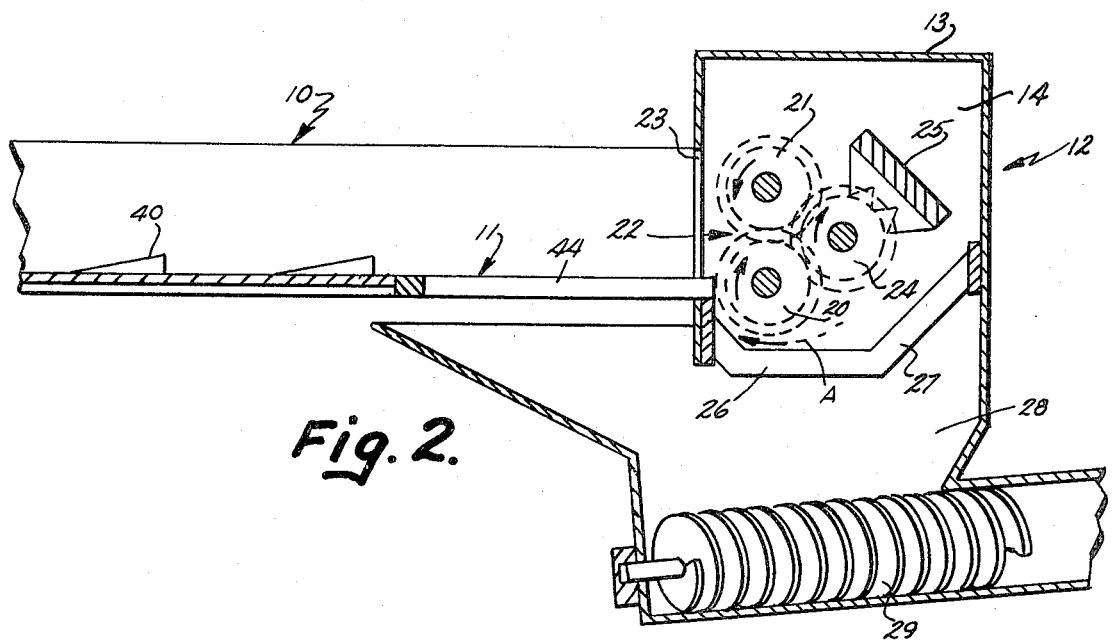
FIG. 2 is a fragmentary sectional, elevational view taken along the plane II—II of FIG. 1.

The numeral 10 identifies a conveyor which terminates in a grate or grizzly 11. The grate 11 connects the conveyor to the crusher 12. The crusher 12 has a housing 13 which encloses a chamber 14. Mounted within the chamber are a pair of crushing rolls 20 and 21 generally arranged vertically one above the other. The crusher rolls 20 and 21 form a scrap receiving path 22 between them. The scrap receiving path faces a receiving port 23 which is an opening in one side of the housing 13. The receiving port 23 is aligned with the end of the grizzly or grate 11 and it is through this port that scrap is received by the crusher.

Behind the crushing rolls 20 and 21 is a third crushing roll 24. This roll is so located that it intercepts the scrap or turnings material as it exits from the path between the roll 20 and 21. The crushing rolls 20, 21 and 24 can be of any of a number of conventional designs currently used for crushing and breaking up materials. Conventionally, these rolls include rows of teeth arranged so that the teeth of one roll will intermesh between the teeth of an adjacent roll resulting in the metal turnings being broken and torn as they pass between the rolls. The rolls 20 and 21 are rotated, as indicated by the arrows, in a manner to draw the metal turnings or scrap from the grate 11 and pull it between the rolls.

The crushing roll 24 is rotated in the same direction as the lower roll 20, thus, tending to wipe the metallic material upwardly where some of it may become entangled with the teeth of the upper roll and be swept around to be passed, once again, through the crushing path. Other portions of the metal are carried around the roll 24 and are crushed as they are dragged through the teeth of the combing bar 25. It will be recognized that as the metal becomes broken down into short lengths or small, chip-like fragments, it is too small to be trapped by the teeth of the rolls and drops away from the rolls to be discharged through the bottom of the crushing chamber 14.

Figure 4:
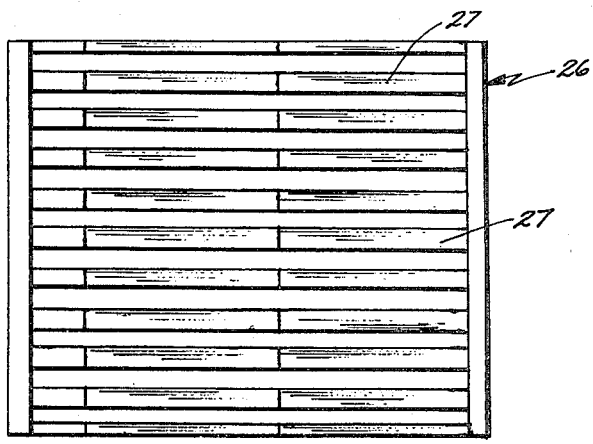
FIG. 4 is a bottom view of the separator screen provided at the base of the crusher chamber.

The bottom of the crushing chamber 14 is formed by the screen 26 which is seen in the bottom view in FIG. 4. The screen consists of a plurality of spaced, parallel bars 27 so shaped as to form a concave bottom for the chamber. The bars are spaced such that that portion of the metal which has been crushed or broken down to the desired size will drop between them but that portion of the metal requiring further crushing is retained. Because of the shape of the screen 26, a generally U-shaped path indicated by the arrow A is created. This path, by its shape, cooperates with the lower roll 20 to cause the metal scrap requiring further crushing to be swept upwardly and returned to the entrance of the scrap receiving path 22. The crushed metal dropping through the screen 26 falls into the discharge chamber 28. At the bottom of the chamber 28 a screw conveyor 29 is provided to remove the crushed metal to other processing equipment. It will be recognized that any other type of conveyor, suitable for transporting the crushed metal can be substituted for the screw conveyor 29. This conveyor does not form any part of this invention.

Figure 3:
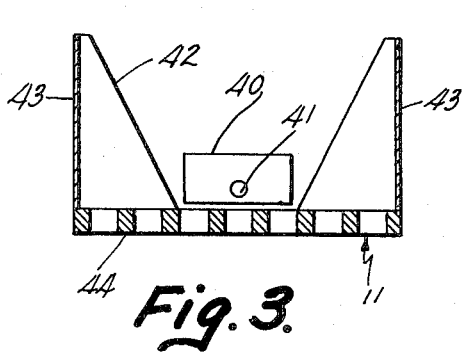
FIG. 3 is a sectional view taken along the plane III—III of FIG. 1.

The supply conveyor 10 can be of various designs suitable for moving the entangled mass of metal turnings created by a typical machine shop operation. In the particular embodiment illustrated, the conveyor is of the harpoon type, having flights 40 mounted on and reciprocated by a rod 41 (FIG. 3). The conveyor is at the bottom of a V-shaped trough 42. The conveyor, as so described, is conventional and the details of its construction form no part of this invention. The supply conveyor 10 discharges onto the grate or grizzly 11. The grate is confined between upright sides 43 and consists of a plurality of spaced parallel bars 44 extending lengthwise of the conveyor and thus in the direction of movement of the metallic scrap material as it is pushed by the conveyor to the crusher 12. The spacing between the bars 44 is such that larger metal chunks along with bar ends, nuts, bolts, screws and other chunky, extraneous metal material, not properly a part of the machine turnings or borings or chips will drop between the bars. Thus, they are separated from the entangled mass of turnings. Also small chips and other components of the scrap metal which are already small enough to be acceptable without passing through the crusher will also drop through the grate. The remainder of the scrap metal will be an entangled collection of turnings and materials which will simply slide across the grate to the crusher.

In its preferred construction the discharge ends of the bars forming the grate terminate short of the ends of the teeth of the rolls. Since the teeth are arranged in rows spaced circumferentially of the rolls with the teeth of one row circumferentially spaced from the teeth of adjacent rows, the length of the gap in the interspace between teeth can be up to about four inches. This arrangement is effective to prevent balls of snarled, coil material from falling between the ends of the grate and the rolls, yet permitting the normal chunk or heavy to drop out.

The crushing rolls 20, 21 and 24 of the crusher are driven by a prime mover 50 which operates through a gear reducer 51 to drive the rollers. Connected to the gear reducer 51 is a torque demand sensor 52. If the torque demanded by the crushing rolls exceeds a certain value, the sensor will stop the rolls and reverse their direction of rotation. By this means, should a large chunk fail to be removed from the scrap material by the grate 11 and enter the crusher to become wedged between the rolls, the rolls will stop, be reversed and the chunk ejected before the rolls are damaged. Preferably, the chunk will be ejected from the rolls with sufficient force to eject it back onto the grate where it can drop through. The rolls then, after a pause, will be caused to restart the crushing action.

FIG. 5 illustrates the fact that the grate 11 need not necessarily be horizontal but can be inclined downwardly toward the crusher 12. This arrangement is particularly useful if the metal turnings or scrap are of a nature which will not readily slide across the grate as a result of being pushed from behind by the conveyor. The inclination of the grate 11a urges the materials to slide down into the path of the crusher rolls. This arrangement is essential where no conveyor is used, the material being dumped in mass into a hopper to be fed to the crusher. In this case the grizzly 11a serves as the bottom of the hopper.

It has been found to be essential that the scrap be positively biased to enter the crusher rolls. This necessity is a result of the physical nature of the scrap. The snarled, bulky material which requires crushing tends to roll up into a ball. Unless it is positively forced to enter the crushing path between the rolls, it will simply roll into a ball ahead of the rolls. While gravity can be used to provide the positive feed, a powered conveyor is preferred.

Figure 6:
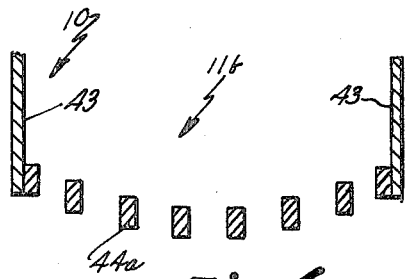
FIG. 6 is a sectional, elevational view illustrating a modification of the grate.

FIG. 6 illustrates the fact that the bars 44a of the grate 11b need not necessarily form a laterally flat surface. In this construction, the grate surface is laterally concave, thus continuing the general shape of the trough-like conveyor.

The invention provides an effective by-pass for the crusher. It will be noted that the scrap material which is passed through this equipment is reunited in the chamber 28 since, in subsequent treatment of the scrap, the product will be classified according to weight and size. Thus, the invention provides a by-pass for the crusher, permitting the bulky, stringy, spring-like coils to be reduced to small pieces without the interference and delay heretofore occasioned by the chunk materials present in the machine scrap as it is received.

The invention materially increases the efficiency of the equipment by either eliminating or substantially eliminating operational shutdowns of the crusher which have previously been required to permit removal of chunk type scrap entering the crusher. It also eliminates the time loss incident to replacement of the crusher rolls or their teeth damaged when large chunks become trapped between them.

The invention also makes possible utilization of a method of continuous, automated machine scrap processing. In this process, as illustrated in FIG. 7, the scrap is forcibly passed over a separator where the fines and chunks are separated from the material requiring crushing. The fines and chunks are discharged along path A and the material to be crushed along path B. The crushed material is discharged from the crusher along path C where it is recombined with the material from path A and conveyed along path D to the classifier. At the classifier the chunks are separated and discharged at E and the remaining fines and crushed material is forwarded along path F to the wringer where the lubricant is removed and the basically lubricant-free scrap discharged to a suitable conveyor or container. A wringer suitable for use in this process is disclosed in U.S. Pat. No. 4,137,176 issued Jan. 30, 1979, entitled "Chip Discharge For Continuous Chip Wringer".

The invention accomplishes its objectives by relatively simple and inexpensive equipment. Being uncomplicated, it is dependable and durable.

While a preferred embodiment of the invention has been described together with a modification, it will be recognized that other modifications can be made within the scope of this invention. Such modifications as do not depart from the principles of the invention are to be considered as included in the hereinafter appended claims unless these claims, by their language, expressly state otherwise.

The embodiments of the invention in which an exclusive property or privilege is claimed are defined as follows:

1. In combination with a shredding and tearing crusher a device for separating chunk metal components from the intermeshed turnings and shavings of metal scrap resulting from machining operations whereby the turnings and shavings can be passed through the crusher free of chunk metal, said device having a generally horizontal receiving section, the crusher having bottom and sides; a horizontally elongated scrap receiving port in one of said sides and a plurality of crushing rolls including a pair of vertically spaced receiving and crushing rolls forming a horizontal scrap receiving path between them at said scrap receiving port; means to drive said rolls; the scrap receiving and crushing path between said rolls being so sized as to be suitable only for turnings and shavings; the improvement in said device comprising: said receiving section having a discharge end; a grate member in said receiving section immediately adjacent said scrap receiving port and means spaced from said grate and said rolls for pushing the metal scrap across said grate, said grate member having a plurality of parallel spaced elongated bars extending lengthwise of said receiving section and over which the scrap is pushed; said bars being spaced to retain said intermeshed turnings and to permit small chips and the chunk metal to pass between them the ends of said bars being so positioned with respect to said crushing rolls as to introduce said turnings generally horizontally into said scrap receiving path between the rolls.

2. The device described in claim 1 wherein a screen is provided in the discharge section at the bottom of said crusher and below said rolls, said screen having a plurality of spaced elongated bars extending normal to the axis of rotation of said rolls, said screen being generally U-shaped to form a concave U-shaped path for the scrap beneath said rolls, said drive means rotating said rolls in a direction to return the insufficiently crushed scrap to the receiving end of said scrap receiving path.

* * * * *